Patented Oct. 16, 1923.

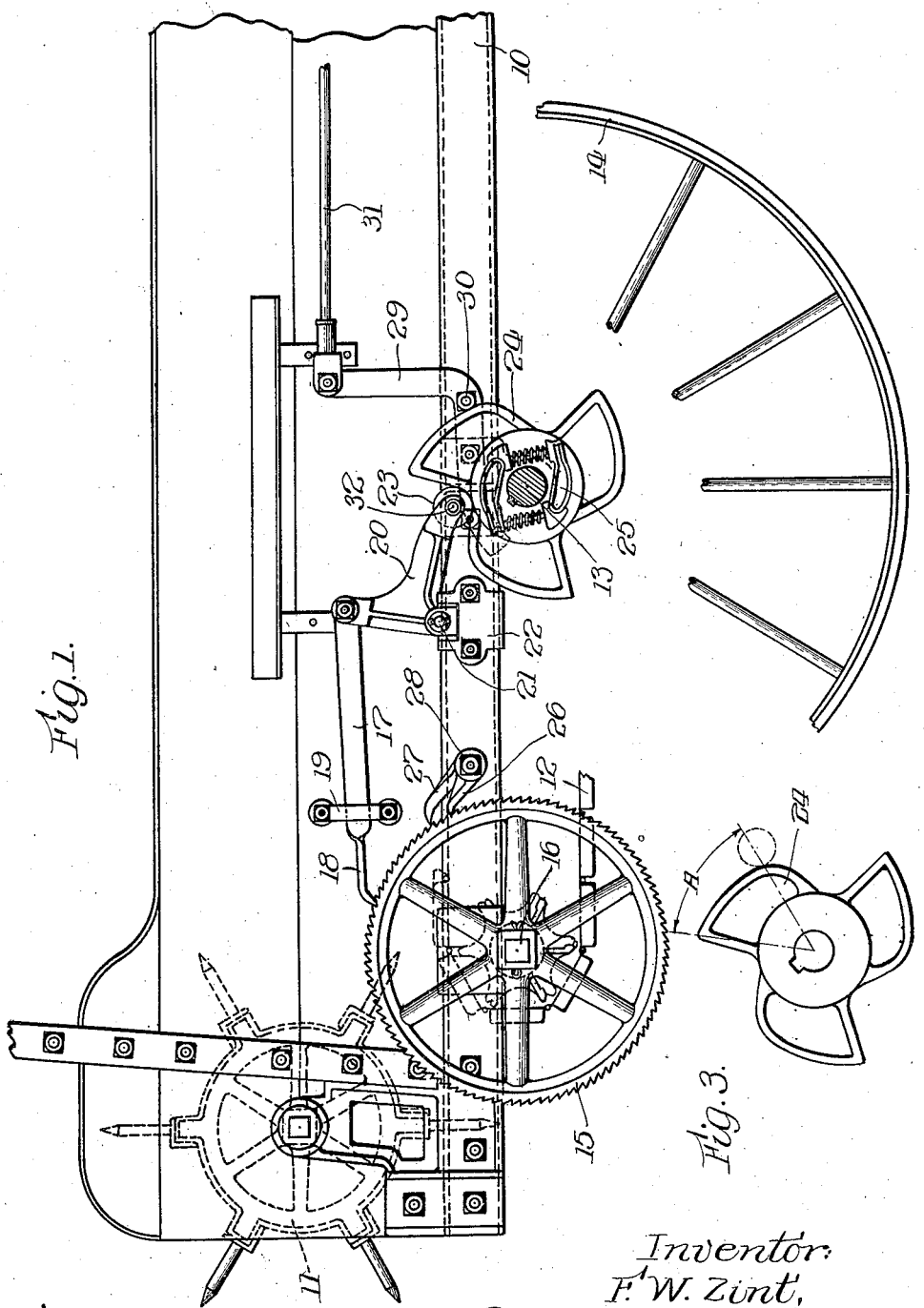

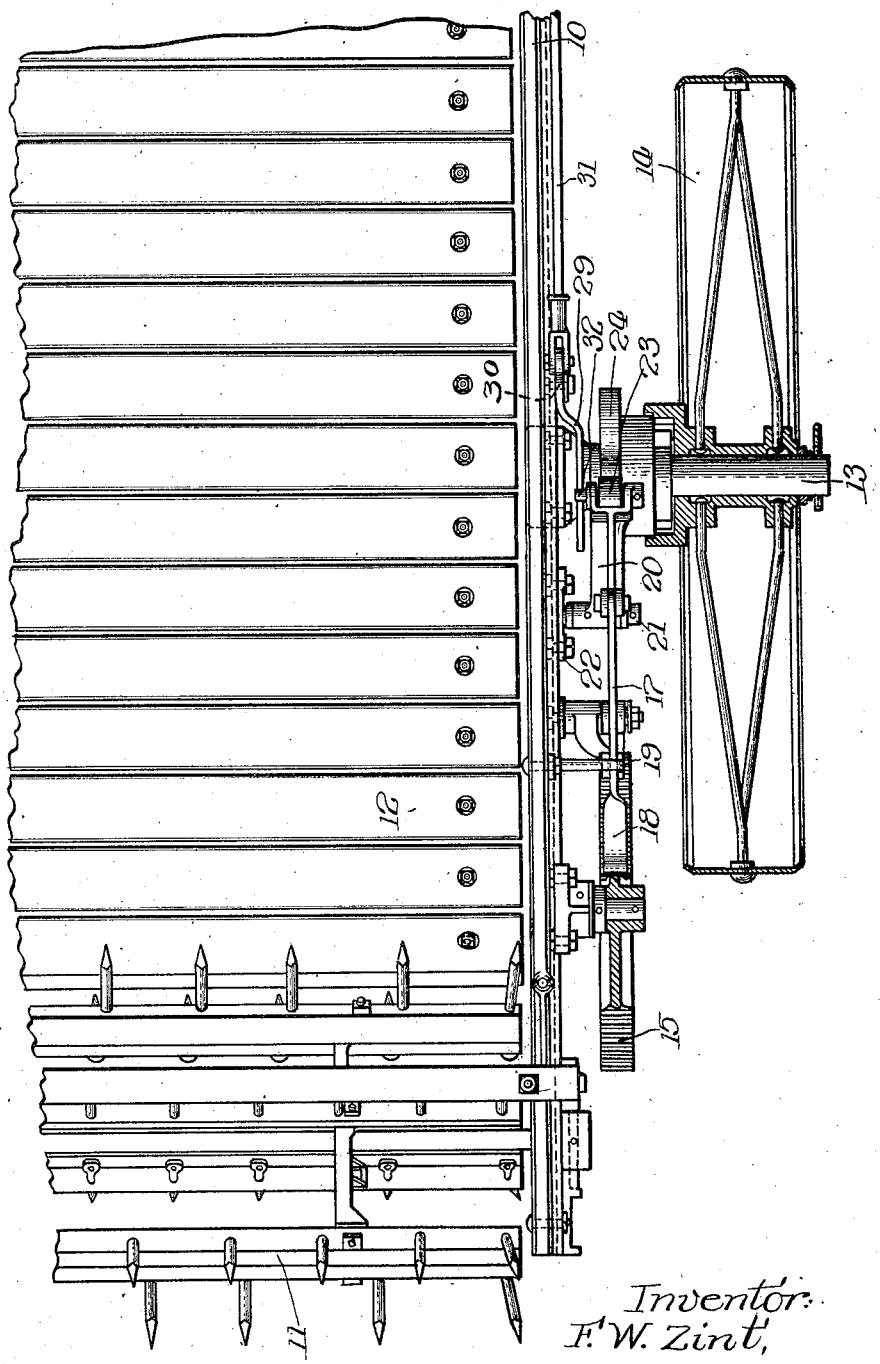

1,471,087

UNITED STATES PATENT OFFICE.

FRANK W. ZINT, OF SPRINGFIELD, ILLINOIS, ASSIGNOR TO MONTGOMERY WARD & CO., INC., OF CHICAGO, ILLINOIS, A CORPORATION OF ILLINOIS.

FEED MECHANISM FOR MANURE SPREADERS.

Application filed December 24, 1919. Serial No. 347,143.

*To all whom it may concern:*

Be it known that I, FRANK W. ZINT, a citizen of the United States, residing at Springfield, in the county of Sangamon and State of Illinois, have invented certain new and useful Improvements in Feed Mechanism for Manure Spreaders, of which the following is a specification.

This invention relates to improvements in manure spreaders, and is concerned more particularly with the feed mechanism thereof.

The object of the invention is the provision of simple and novel means for imparting movement to the apron which supports the load, and to so construct such actuating means that the feeding movement of the apron shall be uniform, and free from jerks and jars.

Other objects and advantages will appear as the nature of the improvements is better understood, the invention consisting substantially in the novel construction, combination and arrangement of parts hereinafter fully described, illustrated in the accompanying drawings, and finally pointed out in the appended claims. In this connection it is to be understood that the form of the invention herein shown and described is but a preferred embodiment thereof, and, therefore, is not to be considered in a restrictive or limiting sense.

In the drawings—

Fig. 1 is a side elevation of the rear end of a manure spreader embodying the herein described invention, parts being broken away for clearness of illustration;

Fig. 2 is a plan view of so much of the structure disclosed in Fig. 1 as is necessary to indicate the invention; and Fig. 3 is a diagrammatic view illustrating the wheel travel in relation to the feed mechanism.

Referring now in detail to the accompanying drawings, the numeral 10 designates the frame of the herein described machine, which frame is provided at its rear end with a rotating beater 11, and likewise with a traveling apron 12 for supporting the load. The rear axle of the machine is designated by the numeral 13, said axle being arranged at the under side of said frame, and said axle has mounted thereon the usual pair of ground wheels 14. The ground wheels 14 have no fixed connection with the axle 13 but are free to rotate thereon.

For imparting the necessary feed to the supporting apron 12 a ratchet wheel 15 is connected to one end of the rear shaft 16 over which said supporting apron operates, and said ratchet wheel 15 is operated by a pawl 17, the rear end of said pawl being flattened to provide an engaging toe 18 which co-operates with the teeth of said wheel. The pawl 17 is received by a guide 19 located at the side of the frame 10, and the forward end of said pawl is pivotally connected to the upwardly-extending arm of a bell-crank lever 20. This lever is mounted to oscillate on an outwardly extending stud 21 carried by a bracket 22, which bracket is also connected to the side of the frame 10, and said bell-crank lever 20 has journalled in its horizontal arm a follower roller 23 which rides over the lobes of an actuating cam 24. This cam is fixedly connected to the axle 13, and the same is operated from the adjacent ground wheel 14 through the medium of dog mechanism 25. The latter may be of any approved construction. The bell-crank lever 20 is positioned at a point intermediate the ratchet wheel 15 and the cam 24, and the horizontal arm thereof overhangs said cam and thereby is maintained in operative relation thereto.

To prevent reverse movement of the ratchet wheel 15 a pair of holding dogs 26 and 27 is employed. These dogs are pivotally mounted on a projecting stud 28, the dog 27 being bent outwardly as illustrated in Fig. 2, in order to overlap the dog 26, and thereby be positioned for engagement with the teeth of the wheel 15. These dogs engage the teeth of the ratchet wheel 15 at different points to insure against reverse movement of said wheel, one serving to hold the tooth of the wheel with which it is engaged, while the other is riding from the tooth with which it was engaged over on to the tooth following.

In order to limit the throw of the bell-crank lever 20 and thereby control the degree of movement of the pawl 17, a bell-crank lever 29 is pivotally mounted, as at 30, on the side of the frame 10. The vertical arm of said lever 29 is connected to an actuating rod 31 which extends to a point in proximity to the position of the operator of the machine for convenient manipulation by the operator, the horizontal arm of the lever 29 projecting rearwardly and being disposed beneath a projecting stud 32 carried by the horizontal arm of the bell-crank lever 20. This stud may be conveniently formed by extending the axis of the follower roller 23, and to facilitate the movement of the stud 32 with respect to the horizontal arm of said lever 29 the rear end of that arm is curved slightly downwardly, as clearly illustrated in Fig. 1.

It will be observed that the active edges of the lobes of the cam 24, beginning respectively at their point of departure from the hub and ending at their high point, traverse an angle of approximately ninety degrees relative to the axis of the shaft 13. It will be observed also that the forward portions of these active edges of the cam lobes extend at a smaller angle relative to the axis of the shaft than do their rearward portions. The last mentioned characteristic of the cam lobes produces first an accelerating movement of the bell crank lever 20, followed by a negative acceleration in its movement, and this is effective in the intermittent operation of the apron 12 to effect a gradual increase in speed from rest followed by a gradual decrease in speed to rest. The wide angular extent of the effective cam edges permits this graduation of speed, and at the same time prolongs the periods in which the apron is in motion, thereby utilizing the maximum travel of the ground wheels between the periods when the apron is at rest. The effective and desired result of this arrangement is the elimination of pronounced jerking or sudden starting and stopping in the movement of the apron, without requiring duplication of the means for transmitting power from the cam to the ratchet wheel.

In the operation of the herein described mechanism, it being assumed that the machine is loaded with manure, and the same is being transported over the ground, the wheel 14 adjacent to the cam 24 causes the latter to rotate as the machine is moved forwardly. As each of the lobes of the cam 24 engages the bell-crank lever 20, the latter is swung upon its pivot so as to move the pawl 17 rearwardly. The toe 18 of said pawl, being in engagement with the ratchet wheel 15, operates the ratchet wheel and thereby moves the apron 12 to convey the load rearwardly to the beater 11 through the medium of which latter instrumentality the manure is distributed. As the follower roller 23 follows the contour of the cam 24 it will be seen that the pawl 17 is drawn forwardly when said roller reaches the low points of said cam and this movement continues so long as the machine is being drawn forwardly. The horizontal arm of the lever 29 acts in the nature of a stop for controlling movement of the bell-crank lever 20, and thereby limits movement of the pawl 17 in relation to the ratchet wheel 15. The extent of movement of the lever 20 may be changed by shifting the bell-crank lever 29 to various positions, and this determines the extent of throw of the horizontal arm of the lever 20 in relation to the cam 24. The number of notches of the ratchet wheel 15 engaged by the pawl 17 is thereby easily determined and regulated.

By referring to Fig. 3 the arcuate line A represents the distance traveled by the ground wheels when the mechanism is set to feed the ratchet wheel 15 back two notches at each stroke of the feed pawl 17. Thus it will be seen that a uniform feed may be had with the mechanism hereinbefore described, due to the fact that the greatest wheel travel is made use of, thus freeing movement of the apron 12 from pronounced jerks and jolts.

I claim:

1. In a feeding mechanism of the class described, the combination with a traveling load support, a ratchet wheel for actuating the same, and a cam, of a feed pawl for actuating said ratchet wheel, a bell-crank lever pivoted at a point intermediate of said ratchet wheel and said cam, one of the arms of said bell-crank lever being connected to said feed pawl, the other arm being arranged for operation by said cam, and a second bell-crank lever having one of its arms projected into the path of movement of the first mentioned bell-crank lever for cooperative contact therewith to control movement thereof in relation to said cam, whereby to vary the feed of said pawl.

2. In a feeding mechanism of the class described, the combination with a traveling load support, a ratchet wheel for actuating the same, and a cam, of a feed pawl for actuating said ratchet wheel, a bell-crank lever pivoted at a point intermediate of said ratchet wheel and said cam, one of the arms of said bell-crank lever being connected to said feed pawl, the other arm of said bell-crank lever being arranged for operation by said cam, a projection carried by said bell-crank, and a pivoted stop device mounted adjacent to said bell-crank lever and projecting into operative contact with the projection of said bell-crank lever to control movement of the latter with relation to the cam, whereby to vary the feed of said pawl.

3. In a feeding mechanism of the class described, the combination with a traveling load support, of a ratchet wheel for actuating the same, a cam, a feed pawl for actuating said ratchet wheel, a bell-crank lever pivoted at a point intermediate of said ratchet wheel and said cam, one of the arms of said bell-crank lever being connected to said feed pawl, the other arm of said bell-crank lever being arranged for operation by said cam, a projection carried by the overhanging arm of said bell-crank lever, a second bell-crank lever pivoted adjacent to said cam, the horizontal arm of said second bell-crank lever being projected into operative contact with said projection of the first bell-crank lever to control movement of the latter in relation to the cam whereby to vary the feed of said pawl, and means connected to said second bell-crank lever for operating the same.

4. In a feeding mechanism of the class described, the combination with a traveling load support, of a ratchet wheel for actuating the same, a cam, a feed pawl for actuating said ratchet wheel, and a bell-crank lever pivoted at a point intermediate of said ratchet wheel and said cam, one of the arms of said bell-crank lever being connected to said feed pawl, the other arm of said bell-crank lever being arranged for operation by said cam, a projection carried by the overhanging arm of said bell-crank lever, a second bell-crank lever pivoted adjacent to said cam, the horizontal arm of said second bell-crank lever being projected into operative contact with said projection of the first bell-crank lever to control movement of the latter in relation to the cam whereby to vary the feed of said pawl, and means connected to said second bell-crank lever for operating the same, the rear end of the projecting arm of said second bell-crank lever being curved downwardly to facilitate movement of the projection of the first bell-crank lever with respect thereto.

5. In a manure spreader, the combination with a traveling load support, a ratchet wheel for actuating the same, and a cam carried by one of the axles of the spreader, of a feed pawl for actuating said ratchet wheel, a pivoted bell crank connected to said feed pawl for actuating said pawl from said cam, and a second pivoted bell crank arranged in proximity to said cam and having one of its arms projected into the path of movement of the first mentioned bell crank, whereby to vary the throw of said bell crank and thereby to vary the movement of said feed pawl.

In testimony whereof I have hereunto signed my name in the presence of two subscribing witnesses.

FRANK W. ZINT.

Witnesses:
C. B. WUNDERLICH,
H. E. JABUSCH.